(12) United States Patent
Fujita et al.

(10) Patent No.: US 12,090,707 B2
(45) Date of Patent: Sep. 17, 2024

(54) MANAGEMENT SYSTEM AND METHOD FOR ACQUIRING AMOUNT OF MATERIAL BASED ON SIMULATING LAMINATE BEING SHAPED

(71) Applicants: MITSUBISHI HEAVY INDUSTRIES MACHINE TOOL CO., LTD., Ritto (JP); TECHNOLOGY RESEARCH ASSOCIATION FOR FUTURE ADDITIVE MANUFACTURING, Tokyo (JP)

(72) Inventors: Yoshihito Fujita, Shiga (JP); Haruhiko Niitani, Shiga (JP)

(73) Assignees: MITSUBISHI HEAVY INDUSTRIES MACHINE TOOL CO., LTD., Ritto (JP); TECHNOLOGY RESEARCH ASSOCIATION FOR FUTURE ADDITIVE MANUFACTURING, Tokyo (JP)

( * ) Notice: Subject to any disclaimer, the term of this patent is extended or adjusted under 35 U.S.C. 154(b) by 553 days.

(21) Appl. No.: 17/419,207

(22) PCT Filed: Dec. 12, 2019

(86) PCT No.: PCT/JP2019/048828
§ 371 (c)(1),
(2) Date: Jun. 28, 2021

(87) PCT Pub. No.: WO2020/213211
PCT Pub. Date: Oct. 22, 2020

(65) Prior Publication Data
US 2022/0118710 A1 Apr. 21, 2022

(30) Foreign Application Priority Data
Apr. 16, 2019 (JP) ................................ 2019-078143

(51) Int. Cl.
*G06F 30/20* (2020.01)
*B29C 64/268* (2017.01)
(Continued)

(52) U.S. Cl.
CPC .......... *B29C 64/393* (2017.08); *B29C 64/268* (2017.08); *B33Y 10/00* (2014.12); *B33Y 50/02* (2014.12)

(58) Field of Classification Search
CPC ..... G06F 30/20; B29C 64/268; B29C 64/393; B33Y 10/00; B33Y 50/02
See application file for complete search history.

(56) References Cited

U.S. PATENT DOCUMENTS 9,767,566 B1 * 9/2017 Paczkowski .......... H04W 4/026
10,800,106 B2 * 10/2020 Park ....................... B29C 64/386
(Continued)

FOREIGN PATENT DOCUMENTS

| CN | 104400998 A | * | 3/2015 |
| JP | 2017-177624 A | | 10/2017 |
| WO | WO 2018/110838 A1 | | 6/2018 |

OTHER PUBLICATIONS

WIPO English translation of CN 104400998 (Year: 2015).*
Extended European Search Report for European Application No. 19925329.5, dated Feb. 1, 2022.

*Primary Examiner* — Alvin H Tan
(74) *Attorney, Agent, or Firm* — Birch, Stewart, Kolasch & Birch, LLP (57) ABSTRACT

A management system is for managing a material of a three-dimensional deposition device that shapes a laminate by irradiation with a light beam and supplying of the material. The management system includes a shape data acquisition unit that acquires shape data of the laminate; a shaping condition setting unit that sets, based on the shape data, a set shaping condition as a shaping condition for (Continued)

shaping the laminate by the three-dimensional deposition device; a shaping simulation execution unit that executes, based on the set shaping condition, a shaping simulation for shaping the laminate with the set shaping condition; and a required material amount acquisition unit that acquires, based on an execution result of the shaping simulation, a required material amount that is an amount of the material required for shaping the laminate by the three-dimensional deposition device.

8 Claims, 6 Drawing Sheets

(51) Int. Cl.
*B29C 64/393* (2017.01)
*B33Y 10/00* (2015.01)
*B33Y 50/02* (2015.01)

(56) References Cited

U.S. PATENT DOCUMENTS

| | | | |
|---|---|---|---|
| 10,889,098 B2* | 1/2021 | Yamazaki | B33Y 50/00 |
| 2004/0254665 A1 | 12/2004 | Fink et al. | |
| 2017/0023929 A1* | 1/2017 | Matsuda | B29C 64/393 |
| 2019/0188346 A1* | 6/2019 | Mirabella | B23K 26/34 |

* cited by examiner

FIG.9

MANAGEMENT SYSTEM AND METHOD FOR ACQUIRING AMOUNT OF MATERIAL BASED ON SIMULATING LAMINATE BEING SHAPED

FIELD

The present invention relates to a management system and a management method of materials used in a three-dimensional deposition device.

BACKGROUND

Recently, three-dimensional deposition devices for manufacturing laminates have been put into practical use. In order to shape a laminate using powder and the like as a material, it is necessary for the three-dimensional deposition device to prepare the amount of material required for shaping. Normally, the amount of material required for manufacturing is estimated from the volume of the laminate to be manufactured, for example. Furthermore, it is disclosed in Patent Literature 1, for example, that the power is ordered based on the inventory balance of the powder material to be used in a 3D printer.

CITATION LIST

Patent Literature

Patent Literature 1: Japanese Patent Application Laid-Open No. 2017-177624

SUMMARY

Technical Problem

Note here that in operation of the three-dimensional deposition device, the whole charged material is not formed into a laminate due to its shaping process. That is, in operation of the three-dimensional deposition device, the material that is used during the shaping process but not for configuring a finished product of laminate is also necessary. Therefore, it is concerned that the amount of material required for shaping may not be estimated accurately based only on the volume of the laminate to be shaped. For example, while an operator can make an estimation by assuming the amount of material not contained in a finished product of laminate, there may be cases where an unskilled operator makes a wrong estimation, or it becomes difficult to make an estimation itself in a case where it is a laminate shaped through complicated steps, or the like. Furthermore, even if the inventory balance is managed as in Patent Literature 1, the required amount of the material for the laminate to be manufactured thereinafter cannot be estimated accurately. Therefore, it is demanded to accurately estimate the amount of material required for shaping.

The present invention has been made to solve the problems described above, and an object of the present invention is to provide a management system and a management method capable of accurately estimating the amount of material required for shaping performed in a three-dimensional deposition device.

Solution to Problem

In order to solve the problems described above and achieve the object, a management system according to the present disclosure is for managing a material of a three-dimensional deposition device that shapes a laminate by irradiation with a light beam and supplying of the material. The management system includes a shape data acquisition unit that acquires shape data of the laminate; a shaping condition setting unit that sets, based on the shape data, a set shaping condition as a shaping condition for shaping the laminate by the three-dimensional deposition device; a shaping simulation execution unit that executes, based on the set shaping condition, a shaping simulation for shaping the laminate with the set shaping condition; a required material amount acquisition unit that acquires, based on an execution result of the shaping simulation, a required material amount that is an amount of the material required for shaping the laminate by the three-dimensional deposition device; and an output control unit that outputs information based on the required material amount to outside.

The management system is capable of calculating the required material amount by also considering the yield, so that it is possible to accurately estimate the amount of material required for shaping performed by the three-dimensional deposition device.

The laminate is shaped by solidifying the material that is being melted. The management system is capable of calculating the required amount of the powder by considering the amount of material that is charged but not for configuring the finished product of the laminate, that is, the yield, so that it is possible to accurately estimate the amount of material required for shaping performed by the three-dimensional deposition device. As the shape data to be acquired, there may be an ideal shape of a target laminate, an actual shape of a shaped laminate measured by a contact- or noncontact-type measurement device, and an estimated shape acquired from a result of measured dimensions of a pool melted by a light beam during actual additive manufacturing.

The shaping simulation execution unit executes, as the shaping simulation, a simulation for shaping the laminate by Directed Energy Deposition that ejects the material and irradiates the material with the light beam. The management system is capable of estimating the amount of material that is used but not for configuring the finished product of the laminate with high precision by executing the shaping simulation, so that the required material amount can be estimated accurately.

The shaping condition setting unit sets, as the set shaping condition, constituent of the material, particle size distribution of the material, supply speed of the material, convergence diameter when the material is ejected, power of the light beam, wavelength of the light beam, intensity distribution (beam profile) of the light beam, focal spot diameter of the light beam on the base part, feeding speed of a deposition head that ejects the material and irradiates the material with the light beam with respect to the base part on which the laminate is shaped, and type of a nozzle for ejecting the material. As for the type of the nozzle, it is possible to make selection from nozzles formed with a single or a plurality of circular or variant ejection ports. By setting the set shaping condition in the manner described above, it is possible to calculate the yield with high precision, and accurately estimate the required material amount.

The required material amount acquisition unit includes, as the required material amount, an amount of the material ejected during a time from a timing at which ejection of the material is started to a timing at which shaping of the laminate is started, an amount of the material ejected from the deposition head after a timing at which supply of the material to the deposition head that ejects the material and irradiates the material with the light beam is stopped, and an amount of the material in a period in which the material is ejected without being irradiated with the light beam. By including those amounts to the required material amount, it is possible to calculate the yield with high precision, and accurately estimate the required material amount.

The shaping condition setting unit updates the set shaping condition based on quality data of the laminate acquired when the laminate is shaped by the three-dimensional deposition device with the set shaping condition. The management system is capable of appropriately setting the set shaping conditions by updating the set shaping conditions based on the actual manufacturing result.

The shape data acquisition unit, the shaping condition setting unit, the shaping simulation execution unit, the required material amount acquisition unit, and the output control unit are provided to a manufacturing management system, and the output control unit orders the material to a material management system that is different from the manufacturing management system based on the required material amount. The management system can properly carry out logistics by building a system that orders the material to the material management system from the manufacturing management system in the manner described above.

Further included are a data acquisition unit that acquires, from a material management system that manages the material, material data indicating a property of the material used for shaping the laminate, and acquires quality data of the laminate shaped by the three-dimensional deposition device; and a collation unit that collates the material data with the quality data, and determines whether the material used for shaping the laminate is appropriate. The management system can properly manage the material by collating the material data with the quality data. When it is found, as a result of acquiring the material data and collating the material data with the quality data with the data acquisition unit that acquires the quality data of the laminate shaped by the three-dimensional deposition device, that the material is a mixture of a plurality of kinds, it is also possible for the system to change or adjust the content ratio of each of the materials.

In order to solve the problems described above and achieve the object, a management method according to the present disclosure is for managing a material of a three-dimensional deposition device that shapes a laminate by irradiation with a light beam and supplying of the material. The management method includes a shape data acquisition step of acquiring shape data of the laminate; a shaping condition setting step of setting, based on the shape data, a set shaping condition as a shaping condition for shaping the laminate by the three-dimensional deposition device; a shaping simulation execution step of executing, based on the shape data and the set shaping condition, a shaping simulation for shaping the laminate with the set shaping condition; a required material amount calculation step of calculating, based on an execution result of the shaping simulation, a required material amount that is an amount of the material required for shaping the laminate by the three-dimensional deposition device; and an output step of outputting information based on the required material amount to outside. The management method is capable of calculating the required material amount by also considering the yield, so that it is possible to appropriately estimate the amount of material required for shaping performed by the three-dimensional deposition device.

Advantageous Effects of Invention

According to the present invention, it is possible to accurately estimate the amount of material required for shaping performed by the three-dimensional deposition device.

DESCRIPTION OF EMBODIMENT

A preferred embodiment of the present invention will be described in detail with reference to the accompanying drawings hereinafter. Note that the present invention is not limited by the embodiment and that the present invention includes, when there are a plurality of embodiments, combinations of each of the embodiments.

Figure 1:
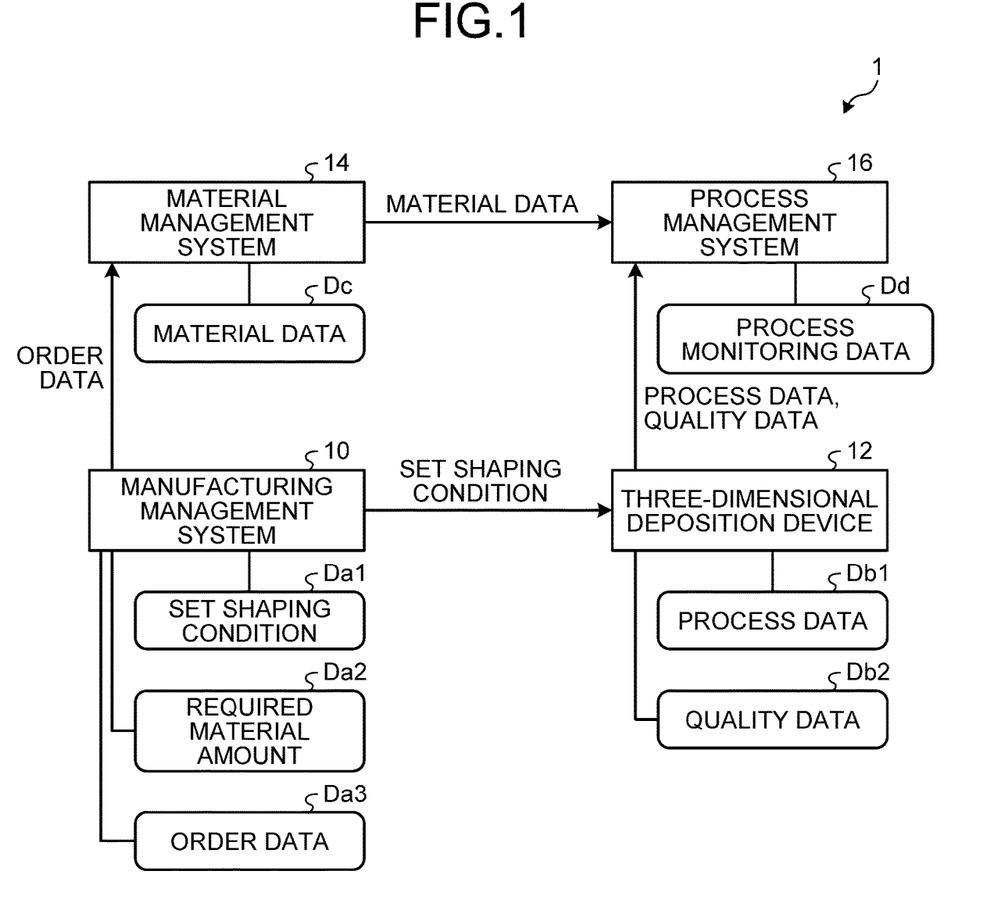
FIG. 1 is a schematic block diagram of a management system according to an embodiment.

Overall Configuration of Management System FIG. 1 is a schematic block diagram of a management system according to the embodiment. As illustrated in FIG. 1, a management system 1 includes a manufacturing management system 10, a three-dimensional deposition device 12, a material management system 14, and a process management system 16. The manufacturing management system 10 is a system that manages shaping conditions and the like of the three-dimensional deposition device 12. The manufacturing management system 10 sets a set shaping condition Da1, a required material amount Da2, and an order data Da3, and stores those in an own storage unit. The set shaping condition Da1 is the condition for the three-dimensional deposition device 12 to shape a laminate, the required material amount Da2 is the amount of material required for the three-dimensional deposition device 12 to shape a unit of laminates, and the order data Da3 is information regarding the order of the material used for shaping the laminates by the three-dimensional deposition device 12, and details thereof will be described later.

The three-dimensional deposition device 12 acquires the set shaping condition Da1 from the manufacturing management system 10, and performs shaping of a laminate with the set shaping condition Da1. The three-dimensional deposition device 12 acquires a process data Db1 and a quality data Db2, and stores those in an own storage unit. The process data Db1 is various kinds of data when shaping the laminate, and the quality data Db2 is data indicating the quality of the manufactured laminate. Details thereof will be described later.

The material management system 14 is a system that manages the material used in the three-dimensional deposition device 12 for shaping the laminates. The material management system 14 acquires the order data Da3 from the manufacturing management system 10, and performs preparation processing of the material to be delivered based on the order data Da3. Furthermore, the material management system 14 acquires a material data Dc as the data indicating the properties of the material to be delivered, and stores it in an own storage unit.

The process management system 16 is a system that accumulates the data regarding the shaping process and the like of the laminate performed by the three-dimensional deposition device 12. The process management system 16 acquires the process data Db1 from the three-dimensional deposition device 12, and stores the process data Db1. Furthermore, the process management system 16 acquires the material data Dc from the material management system 14 and the quality data Db2 from the three-dimensional deposition device 12, and performs collation of the material data Dc and the quality data Db2. The process management system 16 stores the process data Db1, the collation result of the material data Dc and the quality data Db2, and the like as a process monitoring data Dd.

The manufacturing management system 10, the three-dimensional deposition device 12, the material management system 14, and the process management system 16 in the embodiment are separate systems (devices) from each other. Furthermore, the entities (for example, individual, organization, company, and the like) that manage the manufacturing management system 10, the three-dimensional deposition device 12, the material management system 14, and the process management system 16 are different from each other. In the embodiment, the manufacturing management system 10 is managed by the entity (device manufacturer) that has carried out development, manufacture, sales, and the like of the three-dimensional deposition device 12, the three-dimensional deposition device 12 is managed by the entity (manufacturer) that manufactures the laminates, the material management system 14 is manage by the entity that sells the materials, and the process management system 16 is managed by the entity (material manufacturer) that manages the process monitoring data. Note, however, that at least two out of the manufacturing management system 10, the three-dimensional deposition device 12, the material management system 14, and the process management system 16, for example, may be managed by a same entity. Furthermore, at least two out of the manufacturing management system 10, the three-dimensional deposition device 12, the material management system 14, and the process management system 16 may be an integrated system (device).

Three-Dimensional Deposition Device

Figure 2:
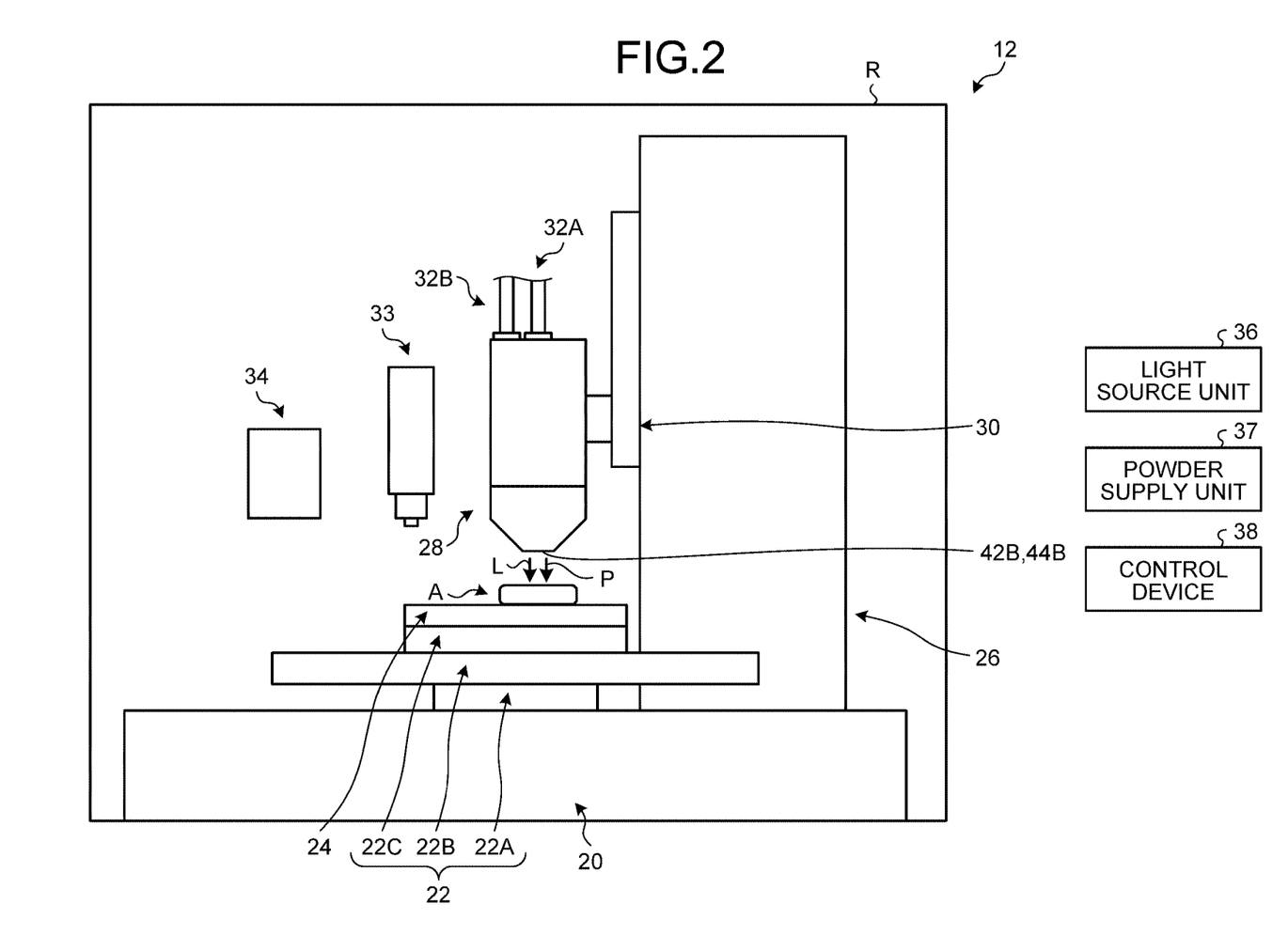
FIG. 2 is a schematic diagram of a three-dimensional deposition device of the embodiment.

First, the three-dimensional deposition device 12 will be described. FIG. 2 is a schematic diagram of the three-dimensional deposition device of the embodiment. In the embodiment, one direction within a horizontal plane is defined as direction X, a direction orthogonal to the direction X within the horizontal plane is defined as direction Y, each direction orthogonal to the direction X and the direction Y, that is, the vertical direction is defined as direction Z. Furthermore, one of the directions along the direction Y is defined as direction Y1, and the other direction among the directions along the direction Y, that is, the opposite direction of the direction Y1 is defined as direction Y2. In the embodiment, the direction Y2 side of the three-dimensional deposition device 12 is the front-face side of the three-dimensional deposition device 12, the direction Y1 side of the three-dimensional deposition device 12 is the back-face side of the three-dimensional deposition device 12. The front-face side of the three-dimensional deposition device 12 is the side where an operator operates the three-dimensional deposition device 12 for shaping a laminate, for example. Furthermore, one of the directions along the direction Z is defined as direction Z1, and the other direction among the directions along the direction Z, that is, the opposite direction of the direction Z1 is defined as direction Z2. In the embodiment, the direction Z1 is the direction toward the upward side of the vertical direction, and the direction Z2 is the direction toward the downward side of the vertical direction. FIG. 2 is a schematic diagram when the three-dimensional deposition device 12 according to the embodiment is viewed from the direction Y. Note that the three-dimensional deposition device 12 according to the embodiment shapes a laminate by using powder P as a material and melting and solidifying the powder P by irradiating the powder P with a light beam L. Note, however, that the three-dimensional deposition device 12 is not limited to use the powder P as the material but may use a wire material (for example, wire metal material), a liquid (for example, liquid-phase metal binder), or the like as the material, for example. While the material to be used is described as the powder P hereinafter, the powder P may be replaced with a material other than the powder P.

As illustrated in FIG. 2, the three-dimensional deposition device 12 includes, within a three-dimensional deposition chamber R, a pedestal 20, a base moving unit 22, a base part 24, a pedestal 26, a deposition head 28, a head moving unit 30, tubes 32A, 32B, a machine processing unit 33, and a process detection unit 34. Furthermore, the three-dimensional deposition device 12 includes a light source unit 36, a powder supply unit 37, and a control device 38. In the embodiment, the light source unit 36, the powder supply unit 37, and the control device 38 are provided outside the three-dimensional deposition chamber R.

The three-dimensional deposition device 12 is a device that shapes a laminate A as a three-dimensional object on the base part 24. The base part 24 is a member to be a base on which the laminate A is shaped. The base part 24 of the embodiment is a plate-like member. However, the base part 24 is not limited thereto. While the base part 24 is the member to be the base of the laminate A as a separate body from the laminate A, it may also be a member to be a part of the laminate A by being integrated with the laminate A.

The pedestal 20 is a pedestal that supports the base moving unit 22, the base part 24, and the like. The base moving unit 22 is provided on the pedestal 20, and supports the base part 24. The base moving unit 22 is a mechanism that moves the base part 24 under control of the control device 38. The base moving unit 22 includes a first moving part 22A, a second moving part 22B, and a rotation part 22C. The first moving part 22A is a mechanism that moves the base part 24 toward a first direction (orthogonal to the vertical direction) that is along the horizontal direction. In the embodiment, the first moving part 22A moves the base part 24 along the direction Y. More specifically, in the embodiment, the second moving part 22B, the rotation part 22C, and the base part 24 are disposed on the first moving part 22A, and the first moving part 22A moves the second moving part 22B, the rotation part 22C, and the base part 24 along the direction Y.

The second moving part 22B is a mechanism that moves the base part 24 toward a second direction (orthogonal to the vertical direction) that is along the horizontal direction, and the second direction is a direction orthogonal to the first direction. In the embodiment, the second moving part 22B moves the base part 24 along the direction X. More specifically, in the embodiment, the rotation part 22C and the base part 24 are disposed on the second moving part 22B, and the second moving part 22B moves the rotation part 22C and the base part 24 along the direction X. While the first moving part 22A and the second moving part 22B in the embodiment are sliders that move the base part 24 loaded on the top side thereof, those may also be mechanisms other than the sliders.

The rotation part 22C is a turn table on which the base part 24 is disposed. The rotation part 22C rotates the base part 24 disposed on the top side thereof by rotating about at least a single rotation axis. In the embodiment, the rotation part 22C rotates the base part 24 by having three rotation axes orthogonal to each other as the center of rotation.

As described above, the base moving unit 22 moves the base part 24 along the direction X and the direction Y via the first moving part 22A and the second moving part 22B. Furthermore, the base moving unit 22 rotates the base part 24 by having the three rotation axes as the center of rotation via the rotation part 22C. That is, the base moving unit 22 is a 5-axis moving mechanism that moves the base part 24 along the two axes and rotates about the three rotation axes. Note, however, that the base moving unit 22 is not limited to the 5-axis moving mechanism but may be a 2-axis moving mechanism that moves the base part 24 along the direction X and the direction Y, for example.

The pedestal 26 is a pedestal provided within the three-dimensional deposition chamber R, and a head moving unit 30 is provided thereto in the embodiment.

The deposition head 28 is provided on the direction Z1 side of the base part 24, that is, on the upward side of the vertical direction of the base part 24. The deposition head 28 forms a laminate on the base part 24 by irradiating the base part 24 with the light beam L from a light beam irradiation port 42B and ejecting the powder P toward the base part 24 from a powder ejection port 44B. That is, the three-dimensional deposition device 12 according to the embodiment is a Directed Energy Deposition type three-dimensional deposition device including the deposition head 28.

Figure 3:
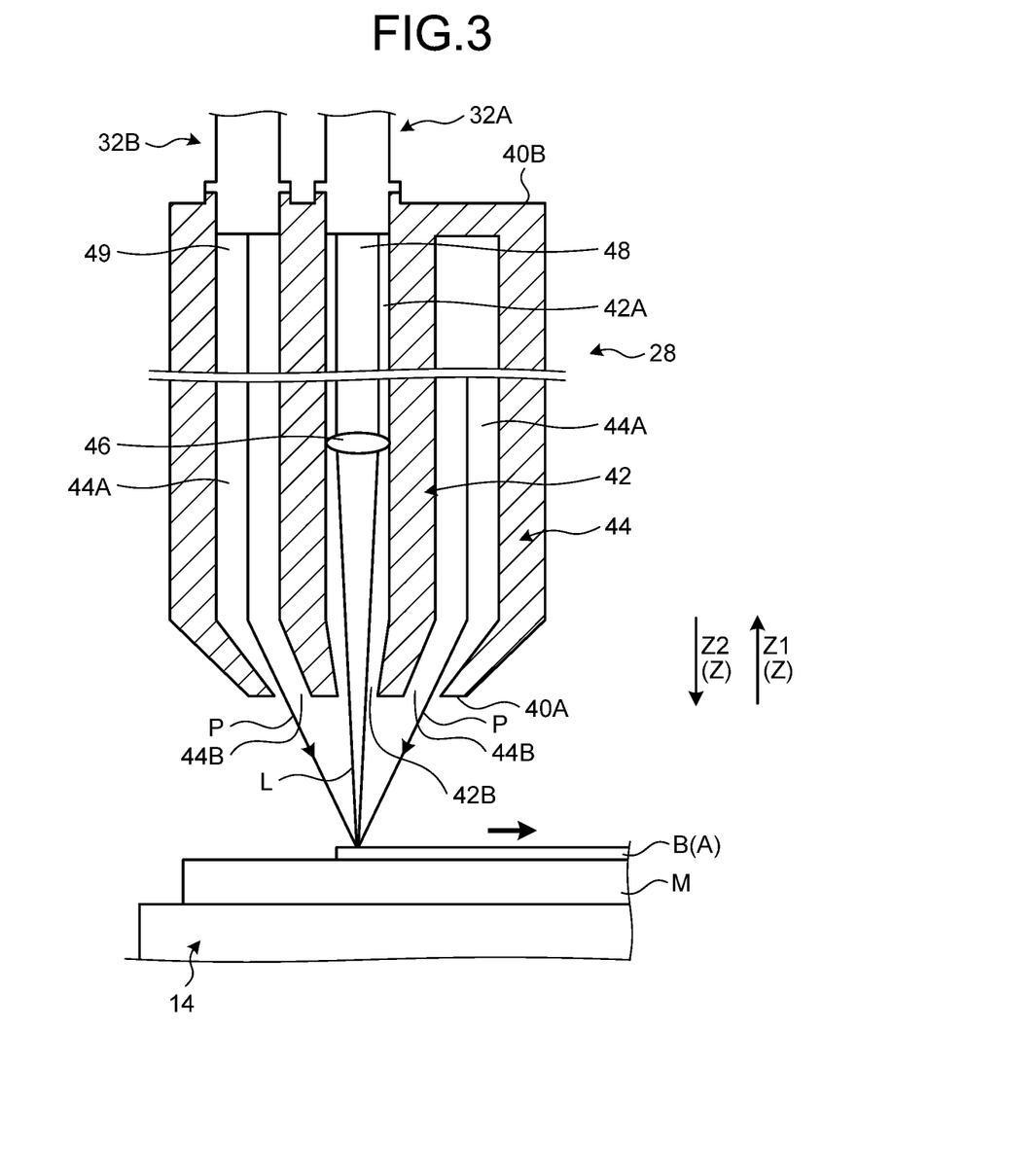
FIG. 3 is a schematic diagram of a deposition head according to the embodiment.

FIG. 3 is a schematic diagram of the deposition head according to the embodiment. As illustrated in FIG. 3, the deposition head 28 includes an inner tube 42 and an outer tube 44. The outer tube 44 is a tubular member, and the diameter becomes smaller toward the front end, that is, toward the direction Z2. The inner tube 42 is also a tubular member, and the diameter becomes smaller toward the front end, that is, toward the direction Z2. The inner tube 42 is inserted into the inner side of the outer tube 44, so that a double tube is configured with the inner tube 42 and the outer tube 44. As for the deposition head 28, the space on the inner peripheral face side of the inner tube 42 forms a beam path 42A for the light beam L to pass through. Furthermore, in the deposition head 28, the space between the outer peripheral face of the inner tube 42 and the inner peripheral face of the outer tube 44 forms a powder flow path 44A for the powder P to pass through. That is, the powder flow path 44A is a flow path in a shape surrounding the periphery of the beam path 42A. In the embodiment, the powder flow path 44A is disposed concentrically with the outer circumference of the beam path 42A.

The deposition head 28 has the light beam irradiation port 42B opened at an end portion 40A thereof on the direction Z2 side. Furthermore, the deposition head 28 has a fiber connection port 48 provided at an end portion 40B thereof on the direction Z1 side, that is, at the end portion on the opposite side of the end portion 40A. The fiber connection port 48 is an opening provided at the end portion 40B. The light beam irradiation port 42B communicates with the fiber connection port 48 via the beam path 42A. That is, the light beam irradiation port 42B is the opening on the direction Z2 side of the beam path 42A, and the fiber connection port 48 is the opening on the direction Z1 side of the beam path 42A. Furthermore, the deposition head 28 is provided with an optical element 46 at a position between the light beam irradiation port 42B and the fiber connection port 48 of the beam path 42A. The optical element 46 includes a collimator lens that collimates the light beam L, and a condenser lens that condenses the collimated light beam L, for example. However, the configuration of the optical element 46 is not limited thereto but may be determined arbitrarily.

To the fiber connection port 48, a tube 32A as a fiber is connected. The tube 32A is a fiber connected to the light source unit 32 to be the light source of the light beam L, and an end portion thereof is connected to the fiber connection port 48. The light beam L from the light source unit 32 makes incident onto the tube 32A through which the incident light beam L is guided to the end portion connected to the fiber connection port 48, and the light beam L is emitted from the end portion to the inside the beam path 42A of the deposition head 28. The light beam L emitted to the inside the beam path 42A travels toward the direction Z2 within the beam path 42A, passes through the optical element 46, and it is emitted to the outside of the deposition head 28 from the light beam irradiation port 42B. The light beam L emitted from the light beam irradiation port 42B travels toward the direction Z2, and the base part 24 is irradiated with the light beam L.

Furthermore, the deposition head 28 has the powder ejection port 44B opened at the end portion 40A on the direction Z2 side. The powder ejection port 44B is opened to surround the light beam irradiation port 42B. Furthermore, the deposition head 28 has a tube connection port 49 provided at the end portion 40B on the direction Z1 side. The tube connection port 49 is an opening provided at the end portion 40B. The powder ejection port 44B communicates with the tube connection port 49 via the powder flow path 44A. That is, the powder ejection port 44B is the opening on the direction Z2 side of the powder flow path 44A, and the tube connection port 49 is the opening on the Z1 side of the powder flow path 44A.

To the tube connection port 49, a tube 32B is connected. The tube 32B is a tube connected to the powder supply unit 37 that is a tank where the powder P is stored, and its end portion is connected to the tube connection port 49. The tube 32B guides the powder P from the powder supply unit 37 to the end portion connected to the tube connection port 49, and supplies the powder P from the end portion to the inside the powder flow path 44A of the deposition head 28. The powder P supplied to the inside the powder flow path 44A travels in the powder flow path 44A toward the direction Z2, and it is ejected to the outside the deposition head 28 from the powder ejection port 44B. The powder P ejected from the powder ejection port 44B travels toward the direction Z2, and it is ejected toward the base part 24.

Note here that the base part 24 is irradiated with the light beam L with a prescribed convergence diameter. In a case of FIG. 3, a substrate M on the base part 24 is irradiated with the light beam L such that the convergence diameters, that is, the convergence positions of the light beams overlap with each other. While the substrate M is a member to be a base material of a laminate, it may also be a laminate that is being shaped by the three-dimensional deposition device 12. The substrate M is melted by the light beam L, and the melted substrate M forms a melt pool. Furthermore, the powder P with a prescribed convergence diameter is ejected toward the base part 24. The powder P is ejected toward the melt pool such that the convergence position overlaps with the melt pool. Therefore, the powder P ejected from the powder ejection port 44B is melted within the melt pool. Furthermore, since the base part 24 is moved with respect to the deposition head 28, the position irradiated with the light beam L changes. Accordingly, the section where the melt pool is formed by irradiation with the light beam L is cooled and solidified because the light beam L is not emitted any more, thereby forming a bead B. By three-dimensionally building up the bead B, the laminate A is shaped.

While the light beam L in the embodiment is a laser beam, it is not limited to a laser beam but may be an electron beam or the like, for example. Furthermore, while the powder P in the embodiment is metal powder, it is not limited to the metal powder as long as it is powder. Furthermore, as described above, it is also possible to use materials other than the powder P.

In the case of FIG. 2 and FIG. 3, while the tube 32A that transmits the light beam L and the tube 32B that supplies the powder P are connected to the deposition head 28, other tubes may be connected to the deposition head 28 as well. For example, a tube for supplying a gaseous body to the deposition head 28, a tube for supplying coolant to the deposition head 28, or the like may be connected to the deposition head 28. As the gaseous body supplied via the tube connected to the deposition dead 28, there may be air supplied to the powder flow path 44A for carrying the powder P, an inert gas supplied to cover the outer circumference of the area where the powder P and the light beam L are supplied, and the like.

Returning to FIG. 2, the head moving unit 30 moves the deposition head 28 along the direction Z. In the embodiment, the head moving unit 30 is attached to the pedestal 26. The head moving unit 30 moves the deposition head 28 along the direction Z. In the embodiment, while the head moving unit 30 is a slider that moves the deposition head 28, it may also be a mechanism other than the slider. Furthermore, the head moving unit 30 is not limited to be attached to the pedestal 26, but the attached position thereof may be determined arbitrarily.

The machine processing unit 33 performs machine processing of the laminate A. As illustrated in FIG. 2, the machine processing unit 33 is provided in the direction Z2 of the base part 24, and performs machine processing such as cutting for the laminate A by having a tool at the front end thereof come in contact with the laminate A, for example.

The process detection unit 34 is a sensor that detects the process data Db1 at the time of shaping the laminate A. In the embodiment, the process detection unit 34 is a sensor that monitors the laminate A while being shaped, such as the melt pool.

Figure 4:
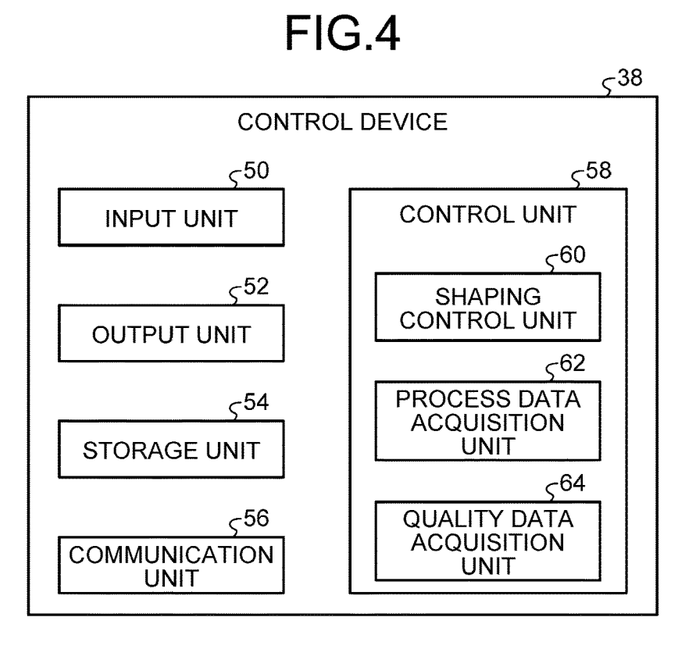
FIG. 4 is a schematic block diagram of a control device of the three-dimensional deposition device according to the embodiment.

FIG. 4 is a schematic block diagram of the control device of the three-dimensional deposition device according to the embodiment. The control device 38 is a device that controls the three-dimensional deposition device 12, which herein is a computer. FIG. 4 is a block diagram of the control device according to the embodiment. As illustrated in FIG. 4, the control device 38 includes an input unit 50, an output unit 52, a storage unit 54, a communication unit 56, and a control unit 58. The input unit 50 is an input device that receives operations of users. The output unit 52 is a display device that displays control content and the like of the control unit 58. The storage unit 54 is a memory for storing information and the like of calculation content and computer programs of the control unit 58, and includes at least one among main memories such as a Random Access Memory (RAM) and a Read Only Memory (ROM), and external storage devices such as a Hard Disk Drive (HDD), and the like, for example. The storage unit 54 stores the process data Db1 and the quality data Db2 acquired by the control unit 58. The communication unit 56 is a mechanism that communicates with external devices, that is, a communication interface. The communication unit 56 is a Wi-Fi (registered trademark) module, antenna, or the like, for example. The control unit 58 is an arithmetic computing unit, that is, a Central Processing Unit (CPU).

The control unit 58 includes a shaping control unit 60, a process data acquisition unit 62, and a quality data acquisition unit 64. The shaping control unit 60, the process data acquisition unit 62, and the quality data acquisition unit 64 are implemented by reading out software (computer program) stored in the storage unit 54 by the control unit 58, and execute processing to be described later. While the control device 38 is a single device that executes the processing to be described later by the control unit 58, a plurality of units may handle the processing to be described later. In other words, the control device 38 may be configured with a plurality of units.

The shaping control unit 60 controls shaping of the laminate A. The shaping control unit 60 acquires, from the manufacturing management system 10, the set shaping condition Da1 as a shaping condition of the laminate A to be shaped thereinafter. The shaping condition is an operation condition of the three-dimensional deposition device 12 for shaping the laminate A, that is, a recipe. The set shaping condition is set by the manufacturing management system 10, and details thereof will be described later. The shaping control unit 60, based on the set shaping condition Da1, controls the base moving unit 22 to move the base part 24 and controls the deposition head 28 and the like to eject the powder P while emitting the light beam L from the deposition head 28 so as to shape the laminate A. More specifically, the shaping control unit 60 shapes the bead B by emitting the light beam L and ejecting the powder P from the deposition head 28 while moving the base part 24. After shaping a single bead B, the shaping control unit 60 continues to shape the next bead B. For example, the shaping control unit 60 shapes a shaped body by shaping a single or a plurality of the beads B on a same plane. Then, the shaping control unit 60 shapes a shaped body further on the shaped body and builds up the shaped bodies over one another to shape the laminate A. That is, it is considered that the laminate A is acquired by building up the shaped bodies. Furthermore, the shaping control unit 60 performs machine processing on the laminate A based on the set shaping condition Da1. Furthermore, the shaping control unit 60 executes various kinds of control for shaping the laminate A, such as controlling the head moving unit 30 to move the deposition head 28 to the direction Z, controlling the light source unit 36 to control the power of the light beam L, controlling the powder supply unit 37 to control the kind, flow amount, and the like of the powder P, and controlling supply of a carrier gas and coolant.

The process data acquisition unit 62 acquires the process data Db1 of the three-dimensional deposition device 12. The process data Db1 is the data indicating the state of the three-dimensional deposition device 12 and the laminate A while the laminate A is being shaped. The process data Db1 is the power of the light beam L, the feeding speed, the supply amount of the powder P, the temperature distribution of the melt pool, the machine coordinate, and the like, for example. The feeding speed indicates the relative speed of the deposition head 28 with respect to the base part 24 and, in the embodiment, indicates the moving speed of the base part 24 with respect to the deposition head 28 when the deposition head 28 is ejecting the powder P and irradiating the powder P with the light beam L. Furthermore, the supply amount of the powder P is the ejection amount of the powder P ejected from the deposition head 28, and the temperature distribution of the melt pool is the distribution of the temperatures of the melt pool generated when shaping the laminate A. Furthermore, the machine coordinate is the coordinate of the position (convergence position of the powder P and the light beam L) to which the deposition head 28 supplies the powder P and the light beam L. The process data acquisition unit 62 acquires, as the process data Db1, the data detected by the sensor such as the process detection unit 34 while shaping the laminate A. For example, the temperature distribution of the melt pool is calculated based on an image of the melt pool captured by the process detection unit 34. However, the process data Db1 is not limited to be detected by the sensor. For example, the process data acquisition unit 62 may acquire values (power of the light beam and the like, for example) set by the shaping control unit 60 at the time of shaping of the laminate A.

The quality data acquisition unit 64 acquires the quality data Db2 indicating the quality of the laminate A that is manufactured by the three-dimensional deposition device 12. In the embodiment, the quality data Db2 is preferable to be the data that indicates the quality of not the laminate A that is being shaped but the quality of the completed laminate A. For example, a device different from the three-dimensional deposition device 12 inspects the quality of the laminate A, and the quality data acquisition unit 64 acquires the inspection result as the quality data Db2 of the laminate A. However, the three-dimensional deposition device 12 may inspect the quality of the laminate A. As the quality data Db2, there may be strength of the laminate A, surface roughness of the laminate A, density of the laminate A, and the like, for example.

The process data Db1 acquired by the process data acquisition unit 62 and the quality data Db2 acquired by the quality data acquisition unit 64 are stored in the storage unit 54 of the control device 38. Furthermore, the process data acquisition unit 62 and the quality data acquisition unit 64 transmit the process data Db1 and the quality data Db2 to the process management system 16 via the communication unit 56.

Manufacturing Management System

Figure 5:
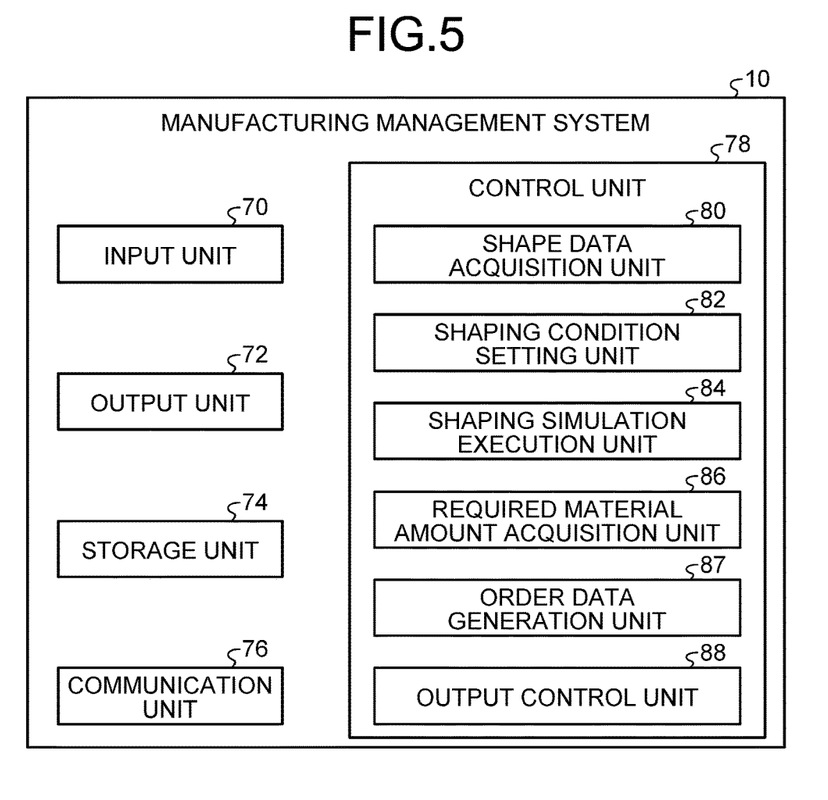
FIG. 5 is a schematic block diagram of a manufacturing management system.

Next, the manufacturing management system 10 will be described. FIG. 5 is a schematic block diagram of the manufacturing management system. The manufacturing management system 10 is a device that manages the shaping condition and the like for shaping the laminate A by the three-dimensional deposition device 12, which herein is a computer. As illustrated in FIG. 5, the manufacturing management system 10 includes an input unit 70, an output unit 72, a storage unit 74, a communication unit 76, and a control unit 78. The input unit 70 is an input device that receives operations of users. The output unit 72 is a display device that displays control content and the like of the control unit 78. The storage unit 74 is a memory for storing information and the like of calculation content and computer programs of the control unit 78, and includes at least one among main memories such as a Random Access Memory (RAM) and a Read Only Memory (ROM), and external storage devices such as a Hard Disk Drive (HDD), and the like, for example. The storage unit 74 stores the set shaping condition Da1, the required material amount Da2, and the order data Da3 acquired by the control unit 78. The communication unit 76 is a mechanism that communicates with external devices, that is, a communication interface. The communication unit 76 is a Wi-Fi (registered trademark) module, antenna, or the like, for example. The control unit 78 is an arithmetic computing unit, that is, a Central Processing Unit (CPU).

The control unit 78 includes a shape data acquisition unit 80, a shaping condition setting unit 82, a shaping simulation execution unit 84, a required material amount acquisition unit 86, an order data generation unit 87, and an output control unit 88. The shape data acquisition unit 80, the shaping condition setting unit 82, the shaping simulation execution unit 84, the required material amount acquisition unit 86, the order data generation unit 87, and the output control unit 88 are implemented by reading out software (computer program) stored in the storage unit 74 by the control unit 78, and execute processing to be described later. While the manufacturing management system 10 is a single device that executes the processing to be described later by the control unit 78, a plurality of units may handle the processing to be described later. In other words, the manufacturing management system 10 may be configured with a plurality of units.

The shape data acquisition unit 80 acquires the shape data of the laminate A that is to be shaped thereafter by the three-dimensional deposition device 12. The shape data is the data that indicates the shape of the laminate A to be manufactured, and an example thereof may be data of a three-dimensional CAD model. The shape data acquisition unit 80 may acquire the shape data from an external device via the communication unit 76 or may read out the shape data stored in the storage unit 74. As the shape data acquired by the shape data acquisition unit 80, there may be an ideal shape of a target laminate, an actual shape of a shaped laminate measured by a contact- or noncontact-type measurement device, an estimated shape acquired from a result of measured dimensions of a melt pool melted by a light beam during actual additive manufacturing, and the like.

The shaping condition setting unit 82 sets, based on the shape data, the shaping condition of the laminate A by the three-dimensional deposition device 12, that is, the set shaping condition Da1. The shaping condition setting unit 82 sets the shaping condition for shaping the laminate A such that the laminate A is formed in a shape indicated by the shape data, and defines the shaping condition as the set shaping condition Da1. That is, the shaping condition setting unit 82 sets the shaping condition by Computer Aided Manufacturing (CAM). The shaping condition setting unit 82 sets, as the set shaping condition Da1, constituents of the powder P (material), particle size distribution of the powder P (material), supply speed of the powder P (material), convergence diameter of the powder P (material) on the base part 24, power of the light beam L, wavelength of the light beam L, intensity distribution (beam profile) of the light beam L, focal spot diameter (convergence diameter) of the light beam L on the base part 24, convergence position of the light beam L and the powder P (material), deposition path, machining path, feeding speed, flow amount of the carrier gas of the powder P, type of the nozzle for ejecting the powder P (material), and the like. The shaping condition setting unit 82 may set, as the set shaping condition Da1, all of or at least one of those mentioned above. For example, as the set shaping condition Da1, the shaping condition setting unit 82 may set at least the supply speed of the material (powder P), the power of the light beam L, and the feeding speed of the deposition head 28. The deposition path means the path of the bead B, indicating that along which direction the bead B is formed, how the bead B is built up, and the like. That is, the deposition path means the moving path of the base part 24 with respect to the deposition head 28, when the deposition head 28 is ejecting the powder P and irradiating the powder P with the light beam L. The machining path means the path indicating how the laminate A is to be machine-processed, which means the moving path of the base part 24 with respect to the machine processing unit 33 when the machine processing unit 33 is machine-processing the laminate A. Furthermore, the deposition path and the machining path also include the order indicating that from which part and how the bead B is formed and machine-processed. Furthermore, the convergence position is the position at which the light beam L and the powder P are converged. The nozzle for ejecting the powder P is the nozzle that forms the powder ejection port 44B of the deposition head 28 from which the powder P is ejected. As for the type of the nozzle, it is possible to make selection from nozzles formed with a single or a plurality of circular or variant ejection ports and the like.

Note that the shaping condition setting unit 82 may set a plurality of kinds constituents for the powder P for a single laminate A. In that case, the shaping condition setting unit 82 sets the constituent of the powder P for each of the deposition paths (for example, the first constituent is set for the first to third layers of the shaped body, and the second material is set for the fourth layer and thereafter). With such setting, the laminate A can be formed with a gradient material with which the constituents vary depending on the area thereof. Note that the constituents of the powder P are not limited to be set based on the shape data by the shaping condition setting unit 82 but may be set according to the requirement regarding what kind of laminate A is to be manufactured, or the like.

Furthermore, the shaping condition setting unit 82 may set, as the set shaping condition Da1, a first lag time that is from a timing at which the deposition head 28 starts ejection of the powder P to a timing at which shaping of the laminate A (generation of the bead B) is started. With the three-dimensional deposition device 12, there may be a case where the ejection amount of the powder P is unstable at the timing at which ejection of the powder P is started. Therefore, the shaping condition setting unit 82 sets the set shaping condition Da1 such that shaping of the laminate A (generation of the bead B) is started after the first lag time has passed from the timing at which ejection of the powder P is started, that is, after the ejection amount is stabilized. Furthermore, the shaping condition setting unit 82 may set, as the set shaping condition Da1, a second lag time that is from a timing at which the powder P is ejected by changing the constituent thereof to a timing at which shaping of the laminate A (generation of the bead B) is started by using the powder P with the changed constituent. In a case where the constituent of the powder P is changed during the shaping process, it is concerned that the powder before the change and the material after the change may be mixed immediately after changing the constituent. Therefore, the shaping condition setting unit 82 sets the set shaping condition Da1 such that shaping of the laminate A (generation of the bead B) using the powder P with the changed constituent is started after the second lag time has passed from the timing at which ejection of the powder P with the changed constituent is started. Furthermore, as the set shaping condition Da1, the shaping condition setting unit 82 may set, as a third lag time, the time where the powder P is ejected stably without being irradiated with the light beam L. There is a case where the three-dimensional deposition device 12 does not emit the light beam L to shape the laminate even in a time zone where a prescribed time has passed from ejection of the powder P so that ejection of the powder P is stable. For example, when performing deposition while reciprocating on a straight path, in order to make the deposition height uniform (in order to avoid influence of the speed change caused by increasing/decreasing the feeding speed), there may be a case that employs a method that temporarily stops irradiation with the light beam L, intentionally overruns irradiation therewith, and then performs a reverse operation. In that case, in order to avoid the time loss until stabilizing discharge of the powder, ejection of the powder P may be continued. The shaping condition setting unit 82 sets such a case as the third lag time. The shaping condition setting unit 82 sets the set shaping condition Da1 to restart irradiation with the light beam L and restart shaping of the laminate A (generation of the bead B) after the third lag time has passed from the timing at which irradiation with the light beam L is stopped while the powder P is being ejected.

The shaping condition setting unit 82 transmits the set shaping condition Da1 set in the manner described above to the control device 38 of the three-dimensional deposition device 12 via the communication unit 76. The shaping condition setting unit 82 transmits the set shaping condition Da1 to the control device 38 by adding a code that can be read by the control device 38. There may be a case where the three-dimensional deposition device 12 performs shaping of the laminate A with the set shaping condition Da1 and acquires the quality data Db2 of the laminate A. In that case, the shaping condition setting unit 82 may acquire the quality data Db2 from the three-dimensional deposition device 12, and reset the set shaping condition Da1 based on the quality data Db2. That is, the shaping condition setting unit 82 may update the set shaping condition Da1 by taking the data of actual shaping performed by the three-dimensional deposition device 12 as feedback data.

Based on the set shaping condition Da1, the shaping simulation execution unit 84 executes a shaping simulation for shaping the laminate A with the set shaping condition Da1. That is, the shaping simulation execution unit 84 executes the simulation for shaping the laminate A by the three-dimensional deposition device 12 by using the set shaping condition Da1, and shapes a virtual laminate A in a shape indicated in the shape data. In other words, the shaping simulation execution unit 84 reads out a simulation model for shaping the laminate A by the three-dimensional deposition device 12, inputs the set shaping condition Da1 to the simulation model as input data, and executes the shaping simulation. Then, the shaping simulation execution unit 84 generates, as output data of the shaping simulation, the virtual laminate A in the shape indicated in the shape data. Furthermore, the shaping simulation execution unit 84 calculates, as the output data, the amount of material required for shaping the laminate A with the set shaping condition Da1. The material herein is the powder P ejected by the deposition head 28, and the amount of material required for shaping the laminate A with the set shaping condition Da1 is the amount of the powder P supplied to the deposition head 28. Note, however, that the material herein is not limited to the powder P but may be a liquid or the like, for example, and the required amount of material may be the amount of liquid required for shaping the laminate A. The output data may include the manufacturing time required for shaping the laminate A. Note that the three-dimensional deposition device 12 is a Directed Energy Deposition type that ejects the powder P and irradiates the powder P with the light beam L. Therefore, the shaping simulation executed by the shaping simulation execution unit 84 is also a simulation for shaping the laminate A by the Directed Energy Deposition.

The required material amount acquisition unit 86 acquires the required material amount that is required for shaping the laminate A by the three-dimensional deposition device 12 based on the result of the shaping simulation executed by the shaping simulation execution unit 84. As described above, the shaping simulation execution unit 84 takes, as the output data, the required material amount that is required for shaping the laminate A with the set shaping condition Da1 when the shaping simulation is executed by using the set shaping condition Da1 as the input data. The required material amount acquisition unit 86 acquires, as the required material amount, the amount of material, which herein is the amount of the powder P, required for shaping the laminate A with the set shaping condition Da1 calculated by the shaping simulation execution unit 84. With the three-dimensional deposition device 12, due to its shaping process, the whole powder P supplied to the deposition head 28 cannot be used for configuring the laminate A. That is, a part of the powder P supplied to the deposition head 28 is actually not the material for configuring the laminate A. The shaping simulation execution unit 84 calculates, as the required material amount, the charged amount of the powder P that is the total of the amount of the powder P used for configuring the laminate A and the amount of the powder P that is charged to the three-dimensional deposition device 12 but not used for configuring the laminate A.

The powder P not used for configuring the laminate A calculated by the shaping simulation execution unit 84 means the powder P that is supplied to the deposition head 28 but not configuring the laminate A in the simulation. The powder P not used for configuring the laminate A includes the powder that is ejected to the base part 24 but not melted to form the laminate A, for example. Furthermore, the powder P not used for configuring the laminate A includes the powder P that is ejected during the time (the first lag time) that is from the timing at which ejection of the powder P is started to the timing at which shaping of the laminate A is started. Furthermore, the powder P not used for configuring the laminate A includes the powder P that is ejected during the time (the second lag time) that is from the timing at which the powder P is ejected by changing the constituent to the timing at which shaping of the laminate A is started by using the powder P with the changed constituent. Furthermore, the powder P not used for configuring the laminate A includes the powder P that is ejected during the time (the third lag time) that is from the timing at which irradiation with the light beam L is stopped while ejecting the powder P to the timing at which irradiation with the light beam L is restarted. Furthermore, the powder P not used for configuring the laminate A includes the powder P that is ejected from the deposition head 28 after the timing at which supply of the powder P to the deposition head 28 is stopped. The deposition head 28 has the powder P remained inside thereof, so that it may be ejected even after supply of the powder P from the powder supply unit 37 is stopped. The powder P that is ejected from the deposition head 28 after the timing at which supply of the powder P to the deposition head 28 is stopped means the powder P remaining inside.

The order data generation unit 87 generates the order data Da3 for ordering the material (the powder P herein) based on the required material amount Da2 acquired by the required material amount acquisition unit 86. The order data generation unit 87 acquires inventory information of the powder P held by the entity that manages the three-dimensional deposition device 12, that is, the reserved amount of the powder P used for shaping. The order data generation unit 87 may acquire the inventory information of the powder P from the three-dimensional deposition device 12 or the management entity thereof. The order data generation unit 87 compares the inventory information of the powder P with the required material amount Da2 acquired by the required material amount acquisition unit 86 to determine whether it is necessary to order the powder P, and generates the order data Da3 when determined as necessary. The order data Da3 includes the amount of the powder P to be ordered and the properties of the powder P to be ordered. The properties of the powder P are the constituent of the powder P, the particle diameter of the powder P, the sphericity of the powder P, and the like. The order data generation unit 87 may acquire information regarding the manufacturing plan and the manufacturing time of the laminate A, for example, and calculate the amount of the powder P to be ordered based on the manufacturing plan, the manufacturing time, the required material amount, and the inventory information of the powder P.

The output control unit 88 outputs the information based on the required material amount to the outside. In the embodiment, the output control unit 88 transmits the order data Da3 to the material management system 14 via the communication unit 76 as the information based on the required material amount. The output control unit 88 orders the powder P by transmitting the order data Da3 to the material management system 14. The output control unit 88 in other words orders the material (the powder P herein) to the material management system 14 based on the required material amount.

Figure 6:
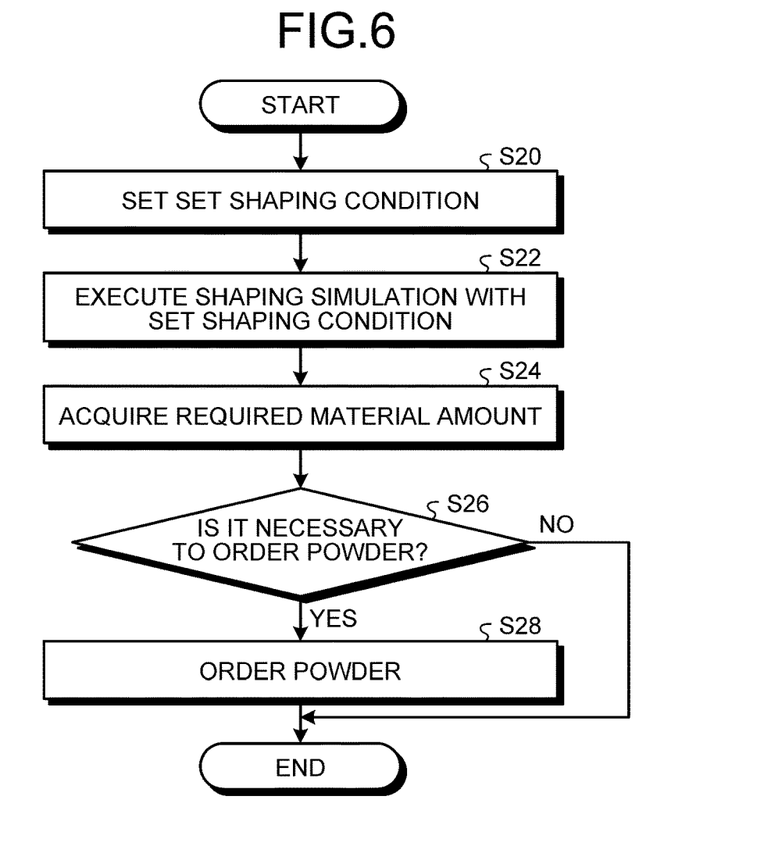
FIG. 6 is a flowchart for describing processing of the manufacturing management system.

The manufacturing management system 10 has the above-described configuration. Next, processing steps of the manufacturing management system 10 will be described. FIG. 6 is a flowchart for describing the processing of the manufacturing management system. As illustrated in FIG. 6, the manufacturing management system 10 sets the set shaping condition Da1 by the shaping condition setting unit 82 (step S20), and executes a shaping simulation with the set shaping condition Da1 by the shaping simulation execution unit 84 (step S22). The shaping simulation execution unit 84 executes the shaping simulation, and calculates the required material amount Da2 for shaping the laminate A with the set shaping condition Da1, which herein is the amount of the powder P required for shaping the laminate A with the set shaping condition Da1. The manufacturing management system 10 acquires, by the required material amount acquisition unit 86, the required material amount Da2 calculated by the shaping simulation execution unit 84 (step S24), and determines, by the order data generation unit 87, whether it is necessary to order the material, which herein is the powder P, based on the required material amount Da2 (step S26). When it is necessary to order the powder P (Yes at step S26), the manufacturing management system 10 generates the order data Da3 indicating the order amount of the powder P by the order data generation unit 87, and orders the powder P by transmitting the order data Da3 to the material management system 14 by the output control unit 88 (step S28). When it is unnecessary to order the powder P, no order of the powder P is issued and the processing is ended.

Note here that the three-dimensional deposition device 12 performs shaping of the laminate A by using the material such as the powder P. Therefore, when shaping the laminate A by the three-dimensional deposition device 12, it is required to know the required amount of the material such as the powder P and keep the required amount of material in stock. However, with the three-dimensional deposition device 12, due to its shaping process, the whole powder P to be used cannot be used for the laminate A. Therefore, it is concerned that the material amount required for shaping cannot be estimated accurately only with the shape data of the laminate A to be manufactured. For that, the manufacturing management system 10 calculates the required material amount by setting the set shaping condition for shaping the laminate A and executing a shaping simulation under the set shaping condition. The shaping simulation is a simulation to replicate shaping of the laminate A under the set shaping condition, so that the manufacturing management system 10 can calculate, in addition to the amount of the powder P used for the laminate A, the amount of the powder P that is used but not used for the laminate A. This makes it possible to calculate the required material amount while considering the amount of the powder P that is used but not used for the laminate A, that is, the yield, so that the material amount required for shaping can be estimated accurately. Especially, the Directed Energy Deposition type three-dimensional deposition device and the three-dimensional deposition device using metal powder tend to have a greater amount of the powder P that is used but not used for the laminate A and have a greater fluctuation in the amount of the powder P that is used but not used for the laminate A depending on the shape and the shaping condition of the laminate A, compared to a bed type three-dimensional deposition device and a three-dimensional deposition device using resin powder or the like. Therefore, when using the Directed Energy Deposition type three-dimensional deposition device or the three-dimensional deposition device using metal powder, it is especially difficult to estimate the required material amount. Even in such a case, the manufacturing management system 10 is capable of accurately estimating the amount of the powder P that is used but not used for the laminate A, so that the required material amount can be estimated appropriately. Furthermore, the three-dimensional deposition device has a small range of shaping conditions with which the laminate A can be shaped properly, and has many kinds of shaping conditions. Therefore, for actually shaping the laminate A by the three-dimensional deposition device 12 in order to estimate the required material amount, for example, the load for setting the shaping condition is great. For that, in the embodiment, the manufacturing management system 10 sets the shaping condition, and performs a simulation under the shaping condition. This makes it possible to suppress having a heavier load for estimating the required material amount.

Material Management System

Figure 7:
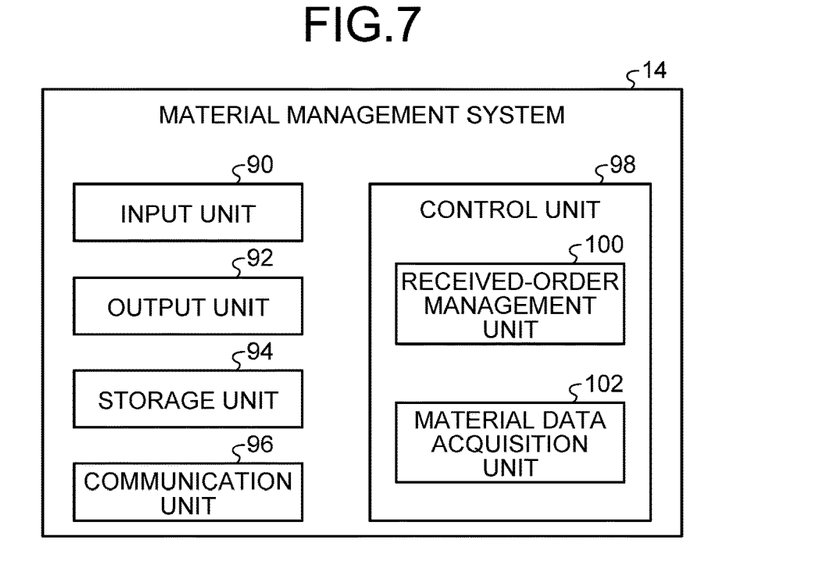
FIG. 7 is a schematic block diagram of a material management system.

Next, the material management system 14 will be described. FIG. 7 is a schematic block diagram of the material management system. The material management system 14 is a device that manages the material for shaping the laminate A by the three-dimensional deposition device 12, which herein is a computer. As illustrated in FIG. 7, the material management system 14 includes an input unit 90, an output unit 92, a storage unit 94, a communication unit 96, and a control unit 98. The input unit 90 is an input device that receives operations of users. The output unit 92 is a display device that displays control content and the like of the control unit 98. The storage unit 94 is a memory for storing information and the like of calculation content and computer programs of the control unit 98, and includes at least one among main memories such as a Random Access Memory (RAM) and a Read Only Memory (ROM), and external storage devices such as a Hard Disk Drive (HDD), and the like, for example. The storage unit 94 stores the material data Dc acquired by the control unit 98. The communication unit 96 is a mechanism that communicates with external devices, that is, a communication interface. The communication unit 96 is a Wi-Fi (registered trademark) module, antenna, or the like, for example. The control unit 98 is an arithmetic computing unit, that is, a Central Processing Unit (CPU).

The control unit 98 includes a received-order management unit 100 and a material data acquisition unit 102. The received-order management unit 100 and the material data acquisition unit 102 are implemented by reading out software (computer program) stored in the storage unit 94 by the control unit 98, and execute processing to be described later. While the material management system 14 is a single device that executes the processing to be described later by the control unit 98, a plurality of units may handle the processing to be described later. In other words, the material management system 14 may be configured with a plurality of units.

The received-order management unit 100 manages the received order of the material, which herein is the powder P, based on the order data Da3 from the manufacturing management system 10. The received-order management unit 100 acquires the order data Da3 transmitted from the manufacturing management system 10 and, based on the content indicated in the order data Da3, executes the processing for preparing the powder P and sending the prepared powder P to the management entity of the three-dimensional deposition device 12. That is, the received-order management unit 100 executes the processing for preparing the powder P having the properties indicated in the order data Da3 for the amount indicated in the order data Da3, and the processing for sending it to the management entity of the three-dimensional deposition device 12. Furthermore, the received-order management unit 100 may manage the information regarding the management entity of the three-dimensional deposition device 12, and the information on the ordered date, ordered amount, shipment date, unit price, delivery date, and the like of the powder P.

The material data acquisition unit 102 acquires the data of the powder P to be sent to the management entity of the three-dimensional deposition device 12 as the material data Dc. The material data acquisition unit 102 transmits the acquired material data Dc to the process management system 16. The material data Dc is the data indicating the properties of the powder P that is sent to the management entity of the three-dimensional deposition device 12. Examples of the material data Dc may be the constituents of the powder P, the particle diameter of the powder P, the sphericity of the powder P, and the like. As the constituents of the powder P, there may be the material composition of the powder P, that is, the component ratio and the like. The material data acquisition unit 102 acquires, as the material data Dc, the measurement result of the properties of the powder P to be sent. Furthermore, as the material data Dc, information regarding the country of manufacture, the manufacturing plant, the manufacturing line, the date of manufacture, the manufacturing batch number, the manufacturing lot number, and the like of the powder P may be included as well.

Process Management System

Figure 8:
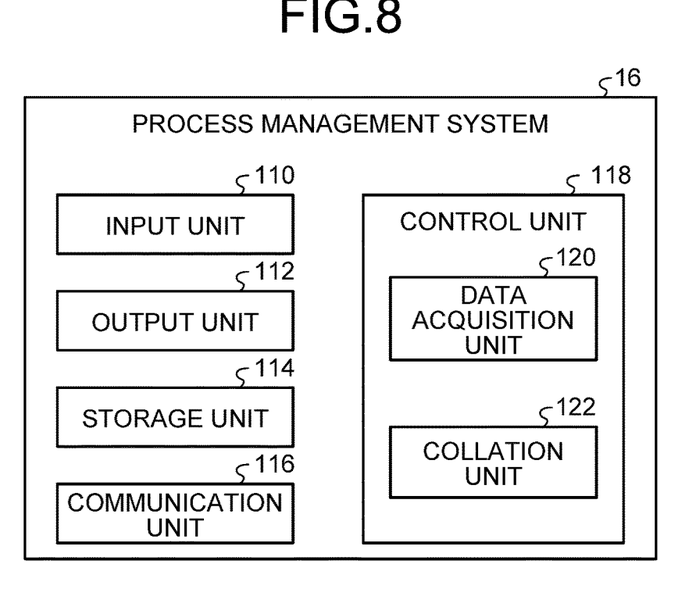
FIG. 8 is a schematic block diagram of a process management system.

Next, the process management system 16 will be described. The process management system 16 is a system that accumulates the process monitoring data Dd regarding the shaping process and the like of the laminate A by the three-dimensional deposition device 12. FIG. 8 is a schematic block diagram of the process management system. As illustrated in FIG. 8, the process management system 16 includes an input unit 110, an output unit 112, a storage unit 114, a communication unit 116, and a control unit 118. The input unit 110 is an input device that receives operations of users. The output unit 112 is a display device that displays control content and the like of the control unit 118. The storage unit 114 is a memory for storing information and the like of calculation content and computer programs of the control unit 118, and includes at least one among main memories such as a Random Access Memory (RAM) and a Read Only Memory (ROM), and external storage devices such as a Hard Disk Drive (HDD), and the like, for example. The storage unit 114 stores the process monitoring data Dd acquired by the control unit 118. The communication unit 116 is a mechanism that communicates with external devices, that is, a communication interface. The communication unit 116 is a Wi-Fi (registered trademark) module, antenna, or the like, for example. The control unit 118 is an arithmetic computing unit, that is, a Central Processing Unit (CPU).

The control unit 118 includes a data acquisition unit 120 and a collation unit 122. The data acquisition unit 120 and the collation unit 122 are implemented by reading out software (computer program) stored in the storage unit 114 by the control unit 118, and execute processing to be described later. While the process management system 16 is a single device that executes the processing to be described later by the control unit 118, a plurality of units may handle the processing to be described later. In other words, the process management system 16 may be configured with a plurality of units.

The data acquisition unit 120 acquires the process data Db1 and the quality data Db2 from the three-dimensional deposition device 12. Furthermore, the data acquisition unit 120 acquires the material data Dc from the material management system 14. The data acquisition unit 120 stores the acquired process data Db1, quality data Db2, and material data Dc to the storage unit 114 as the process monitoring data Dd.

The collation unit 122 collates the quality data Db2 with the material data Dc. The collation unit 122 collates the quality data Db2 with the material data Dc to determine whether the powder P used for shaping the laminate A is appropriate, and stores the determination result in the storage unit 114 as the process monitoring data Dd. Note here that the material data Dc is the property data of the powder P delivered to the management entity of the three-dimensional deposition device 12, and the quality data Db2 is the quality data of the laminate A shaped by the three-dimensional deposition device 12. That is, the quality data Db2 is the data indicating the quality of the laminate A shaped by using the powder P having the properties indicated in the material data Dc. Therefore, it is considered that the material data Dc and the quality data Db2 are the data related to each other. The collation unit 122 collates the quality data Db2 with the material data Dc and links the material data Dc to the quality data Db2 to determine whether the powder P is appropriate. For example, when the quality in the quality data Db2 is lower than a prescribed value, the collation unit 122 determines that the powder P of the material data Dc linked to that quality data Db2 as inappropriate. Meanwhile, when the quality in the quality data Db2 is equal to or higher than the prescribed value, the collation unit 122 determines that the powder P of the material data Dc linked to that quality data Db2 as appropriate. The collation unit 122 stores the determination result regarding whether the powder P is appropriate in the storage unit 114 as the process monitoring data Dd.

Furthermore, the collation unit 122 collates the quality data Db2 with the material data Dc, and links the properties of the powder P indicated in the material data Dc to the quality of the laminate A indicated in the quality data Db2. The collation unit 122 links the degree of the quality of the laminate A for each property of the powder P, that is, for each constitute of the powder P, particle diameter of the powder P, and sphericity of the powder P. Then, the collation unit 122 stores the linked data in the storage unit 114 as the process monitoring data Dd. By using the collated data of the quality data Db2 and the material data Dc as the process monitoring data Dd as described above, it is possible to recognize the influence of the properties of the powder P imposed upon the quality of the laminate A and, by transmitting it to the manufacturing management system 10, the material management system 14, and the like, it is possible to properly manage the quality of the powder P and improve the quality of the laminate A. That is, through collating and linking the quality of the powder P used for shaping the laminate A with the quality of the laminate A shaped by using the powder P by the collation unit 122, it is possible to secure traceability of the material and stabilize the quality.

Figure 9:
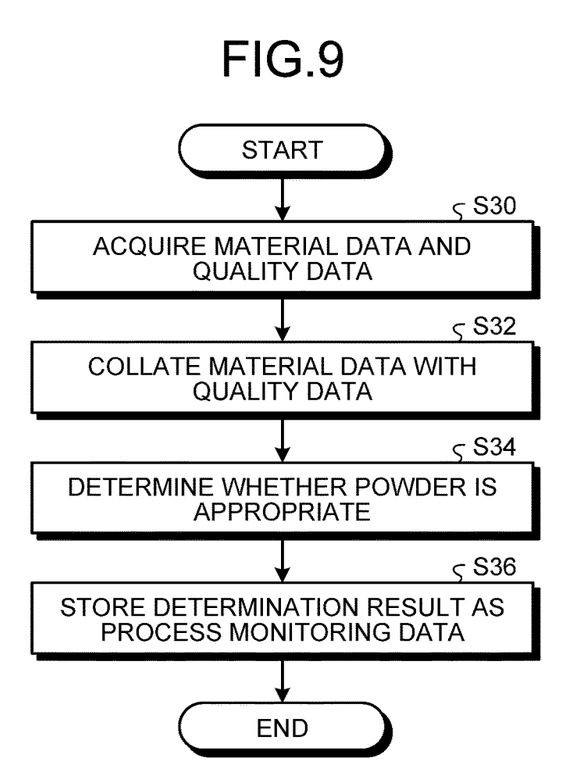
FIG. 9 is a flowchart for describing processing of the process management system.

The process management system 16 has the above-described configuration. Next, processing steps of the process management system 16 will be described. FIG. 9 is a flowchart for describing the processing of the process management system. As illustrated in FIG. 9, the process management system 16 acquires the quality data Db2 and the material data Dc by the data acquisition unit 120 (step S30), collates the quality data Db2 with the material data Dc by the collation unit 122 (step S32), and determines whether the powder P is appropriate (step S34). The process management system 16 stores the determination result regarding whether the powder P is appropriate in the storage unit 114 as the process monitoring data Dd (step S36).

As described above, the management system 1 according to the embodiment is a system that manages the material for the three-dimensional deposition device 12 that shapes the laminate A by emitting the light beam L and supplying the material. The management system 1 includes the shape data acquisition unit 80, the shaping condition setting unit 82, the shaping simulation execution unit 84, the required material amount acquisition unit 86, and the output control unit 88. The shape data acquisition unit 80 acquires the shape data of the laminate A. The shaping condition setting unit 82 sets the set shaping condition Da1 for shaping the laminate A by the three-dimensional deposition device 12 based on the shape data. The shaping simulation execution unit 84 executes, based on the set shaping condition Da1, a shaping simulation for shaping the laminate A with the set shaping condition Da1. The required material amount acquisition unit 86 calculates the required material amount for shaping the laminate A by the three-dimensional deposition device 12 based on the execution result of the shaping simulation. The output control unit 88 outputs the information based on the required material amount to the outside.

The management system 1 calculates the required material amount by setting the set shaping condition that is the condition for shaping the laminate A and by executing the shaping simulation under the set shaping condition. Therefore, the management system 1 is capable of calculating not only the material amount configuring the finished product of the laminate A but also the material amount that is used but not for configuring the finished product of the laminate A. Therefore, the management system 1 is capable of calculating the required material amount by also considering the yield, thereby making it possible to accurately estimate the material amount required for shaping performed by the three-dimensional deposition device 12.

Furthermore, the laminate A is shaped when the melted material is solidified. The management system 1 is capable of calculating the required amount of the powder P by considering the amount of material that is used but not used for the laminate A, that is, by also considering the yield. Therefore, it is possible to accurately estimate the material amount required for shaping performed by the three-dimensional deposition device 12.

Furthermore, as the shaping simulation, the shaping simulation execution unit 84 executes a simulation for shaping the laminate A with the Directed Energy Deposition that ejects the material and irradiates the material with the light beam L. The Directed Energy Deposition type three-dimensional deposition device tends to have a greater amount of the material that is used but not for configuring finished product of the laminate A and have a greater fluctuation in the amount of the material that is used but not for configuring finished product of the laminate A depending on the shape and the shaping condition of the laminate A, so that it is especially difficult to estimate the required material amount. Even in such a case, the management system 1 is capable of estimating the amount of the material that is used but not for configuring the finished product of the laminate A with high precision by executing the shaping simulation, so that the required material amount can be estimated accurately.

Furthermore, the shaping condition setting unit 82 sets, as the set shaping condition Da1, at least the supply speed of the material, the power of the light beam L, and the feeding speed of the deposition head 28. By setting the set shaping condition Da1 in the manner described above, it is possible to calculate with high precision the amount of material that is used but not for configuring the finished product of the laminate A, that is, the yield, and accurately estimate the required material amount by executing the shaping simulation by using the set shaping condition Da1.

Furthermore, as the required material amount, the required material amount acquisition unit 86 includes the amount of material ejected during the time (the first lag time) that is from the timing at which ejection of the material is started to the timing at which shaping of the laminate A is started, the amount of the powder P that is ejected from the deposition head 28 after the timing at which supply of the material to the deposition head 28 is stopped, and the amount of material in the period (the third lag time) where the material is ejected without being irradiated with the light beam L. By including those amounts to the required material amount, it is possible to calculate with high precision the amount of the powder P that is used but not for configuring the finished product of the laminate A, that is, the yield, and accurately estimate the required material amount.

Furthermore, the shaping condition setting unit 82 updates the set shaping condition Da1 based on the quality data Db2 of the laminate A that is acquired when the laminate A is shaped by the three-dimensional deposition device 12 with the set shaping condition Da1. The management system 1 can appropriately set the set shaping condition Da1 by updating the set shaping condition Da1 based on the actual manufacturing result.

Furthermore, the shape data acquisition unit 80, the shaping condition setting unit 82, the shaping simulation execution unit 84, the required material amount acquisition unit 86, and the output control unit 88 are provided to the manufacturing management system 10. Furthermore, based on the required material amount, the output control unit 88 orders the material to the material management system 14 that is a system different from the manufacturing management system 10. The management system 1 can properly carry out logistics by building a system that order the material to the material management system 14 from the manufacturing management system 10 in the manner described above.

Furthermore, the management system 1 includes the data acquisition unit 120 and the collation unit 122. The data acquisition unit 120 acquires, from the material management system 14, the material data Dc indicating the properties of the material used for shaping the laminate A and acquires the quality data Db2 of the laminate A shaped by the three-dimensional deposition device 12. The collation unit 122 collates the material data Dc with the quality data Db2, and determines whether the material used for shaping the laminate A is appropriate. The management system 1 is capable of properly managing the material by collating the material data Dc with the quality data Db2. Furthermore, when it is found as a result of collating the material data Dc with the quality data Db2 that the material is a mixture of a plurality of kinds, it is possible for the management system 1 to change or adjust the content ratio of each of the materials.

While the embodiment of the present invention has been described above, the embodiment is not to be limited by the content thereof. The structural elements described above include those easily occurred to the persons skilled in the art and those substantially the same, which are the so-called equivalents thereof. Furthermore, the structural elements described above may be combined as appropriate. Moreover, various omissions, substitutions, and alterations of the structural elements are possible without departing from the scope and spirit of the above-described embodiment.

REFERENCE SIGNS LIST

1 Management system
10 Manufacturing management system
12 Three-dimensional deposition device
14 Material management system
16 Process management system
80 Shape data acquisition unit
82 Shaping condition setting unit
84 Shaping simulation execution unit
86 Required material amount acquisition unit
87 Order data generation unit
88 Output control unit
A Laminate
Da1 Set shaping condition
Da2 Required material amount
Da3 Order data
Db1 Process data
Db2 Quality data
Dc Material data
Dd Process monitoring data

The invention claimed is:

1. A management system for managing a material of a three-dimensional deposition device that shapes a laminate by irradiation with a light beam and supplying of the material, the management system comprising:
   a shape data acquisition unit that acquires shape data of the laminate;
   a shaping condition setting unit that sets, based on the shape data, a set shaping condition as a shaping condition for shaping the laminate by the three-dimensional deposition device;
   a shaping simulation execution unit that executes, based on the set shaping condition, a shaping simulation for shaping the laminate with the set shaping condition;
   a required material amount acquisition unit that acquires, based on an execution result of the shaping simulation, a required material amount that is an amount of the material required for shaping the laminate by the three-dimensional deposition device;
   an output control unit that outputs information based on the required material amount to outside; and
   wherein the required material amount acquisition unit includes, as the required material amount, an amount of the material ejected during a time from a timing at which ejection of the material is started to a timing at which shaping of the laminate is started, an amount of the material ejected from a deposition head after a timing at which supply of the material to the deposition head that ejects the material and irradiates the material with the light beam is stopped, and an amount of the material in a period in which the material is ejected without being irradiated with the light bean.

2. The management system according to claim 1, wherein the laminate is shaped by solidifying the material that is being melted.

3. The management system according to claim 2, wherein the shaping simulation execution unit executes, as the shaping simulation, a simulation for shaping the laminate by Directed Energy Deposition that ejects the material and irradiates the material with the light beam.

4. The management system according to claim 3, wherein the shaping condition setting unit sets, as the set shaping condition, at least a supply speed of the material, power of the light beam, and a feeding speed of a deposition head that ejects the material and irradiates the material with the light beam with respect to a base part on which the laminate is shaped.

5. The management system according to claim 1, wherein the shaping condition setting unit updates the set shaping condition based on quality data of the laminate acquired when the laminate is shaped by the three-dimensional deposition device with the set shaping condition.

6. The management system according to claim 1, wherein
   the shape data acquisition unit, the shaping condition setting unit, the shaping simulation execution unit, the required material amount acquisition unit, and the output control unit are provided to a manufacturing management system, and
   the output control unit orders the material to a material management system that is different from the manufacturing management system based on the required material amount.

7. The management system according to claim 1, further comprising:
   a data acquisition unit that acquires, from a material management system that manages the material, material data indicating a property of the material used for shaping the laminate, and acquires quality data of the laminate shaped by the three-dimensional deposition device; and
   a collation unit that collates the material data with the quality data, and determines whether the material used for shaping the laminate is appropriate.

8. A management method for managing a material of a three-dimensional deposition device that shapes a laminate by irradiation with a light beam and supplying of the material, the management method comprising:
   acquiring shape data of the laminate;
   setting, based on the shape data, a set shaping condition as a shaping condition for shaping the laminate by the three-dimensional deposition device;
   executing, based on the shape data and the set shaping condition, a shaping simulation for shaping the laminate with the set shaping condition;
   calculating, based on an execution result of the shaping simulation, a required material amount that is an amount of the material required for shaping the laminate by the three-dimensional deposition device;
   outputting information based on the required material amount to outside; and
   wherein the required material amount includes an amount of the material ejected during a time from a timing at which ejection of the material is started to a timing at which shaping of the laminate is started an amount of the material ejected from a deposition head after a timing at which supply of the material to the deposition head that ejects the material and irradiates the material with the light beam is stopped, and an amount of the material in a period in which the material is ejected without being irradiated with the light beam.

* * * * *